US011820202B2

(12) United States Patent
Markie

(10) Patent No.: US 11,820,202 B2
(45) Date of Patent: Nov. 21, 2023

(54) PRESSURE RELIEF VENT ASSEMBLY

(71) Applicant: Illinois Tool Works Inc., Glenview, IL (US)

(72) Inventor: Michael R. Markie, Roseville, MI (US)

(73) Assignee: Illinois Tool Works Inc., Glenview, IL (US)

(*) Notice: Subject to any disclaimer, the term of this patent is extended or adjusted under 35 U.S.C. 154(b) by 301 days.

(21) Appl. No.: 17/365,687

(22) Filed: Jul. 1, 2021

(65) Prior Publication Data

US 2022/0041037 A1 Feb. 10, 2022

Related U.S. Application Data

(60) Provisional application No. 63/060,741, filed on Aug. 4, 2020.

(51) Int. Cl.
*B60H 1/24* (2006.01)
*B60H 1/00* (2006.01)

(52) U.S. Cl.
CPC ......... *B60H 1/249* (2013.01); *B60H 1/00528* (2013.01)

(58) Field of Classification Search
CPC ............................. B60H 1/249; B60H 1/00528
USPC ......................................................... 454/162
See application file for complete search history.

(56) References Cited

U.S. PATENT DOCUMENTS

| 10,358,014 | B2 | 7/2019 | Juroszek et al. |
| 2005/0003755 | A1* | 1/2005 | Koessler ................. F24F 13/08 454/359 |
| 2018/0361827 | A1 | 12/2018 | Carlson et al. |
| 2019/0070934 | A1 | 3/2019 | Carlson |
| 2020/0086716 | A1 | 3/2020 | Carlson |

OTHER PUBLICATIONS

Pressure Relief Valve (PRV) image (available prior to Aug. 4, 2020)(1 page).

* cited by examiner

*Primary Examiner* — Allen R. B. Schult
(74) *Attorney, Agent, or Firm* — Neal, Gerber & Eisenberg LLP

(57) ABSTRACT

A pressure relief vent assembly that defines a plurality of enlarged water collection pockets and a plurality of water passage recesses that enable water to move between the water collection pockets and to be more evenly distributed relative to and in the respective water collection pockets, and thus is configured to inhibit water from entering an enclosed area through the pressure relief vent assembly.

20 Claims, 10 Drawing Sheets

PRESSURE RELIEF VENT ASSEMBLY

PRIORITY

This application claims priority to and the benefit of U.S. Provisional Patent Application Ser. No. 63/060,741, filed Aug. 4, 2020, the entire contents of which is incorporated herein by reference.

BACKGROUND

The present disclosure generally relates to a pressure relief vent assembly usable for an enclosed area (such as a vehicle cabin) and more particularly to a pressure relief vent assembly configured to inhibit liquid from entering the enclosed area through the pressure relief vent assembly.

Interior cabins of vehicles typically include cabin pressure relief vents that facilitate the reduction of air pressure build-up inside the vehicle cabin, which can be detrimental to an occupant's ear drums. For example, when a vehicle door is closed, one or more pressure relief vents enable air pressure within the vehicle cabin to be to relieved. This protects the occupant's ears and also facilitates proper closing of the vehicle door. Known pressure relief vents also relieve air pressure in a vehicle cabin when an air bag inside the vehicle cabin is activated. This also protects an occupant's ear drums.

Various known pressure relief vents in vehicles are typically hidden from view. For example, a pressure relief vent may be positioned in a component of a vehicle such as a panel or a frame of the vehicle. Various known pressure relief vents device snap fit to such components.

Various known pressure relief vents are configured to allow air to pass out of an enclosed area (such as vehicle cabin) and to prevent water, air, dust, and other contaminants from entering the enclosed area through the pressure relief vent. Various known pressure relief vents thus generally function as one-way valves (somewhat like check valves) and are also configured to maintain a small amount of desired back pressure.

However, certain known pressure relief vents allow water to flow through the pressure relief vent in various different circumstances such as when the vehicle is parked at a certain angle, when the vehicle makes a sudden stop, or when the vehicle accelerates rapidly. Accordingly, there is a continuing need for pressure relief vents that inhibit such water flow into the vehicles in normal operating conditions and in such various different circumstances.

BRIEF SUMMARY

Various embodiments of the present disclosure provide a pressure relief vent assembly that better prevents water from flowing through the pressure relief vent assembly in various different circumstances during operation of the vehicle.

In various embodiments of the present disclosure, the pressure relief vent assembly includes a plurality of closable air passage chambers that respectively define openable airflow passages. The plurality of closable air passage chambers define a plurality of enlarged water collection pockets and a plurality of water passage recesses that enable water to move between the water collection pockets and to be more evenly distributed relative to and in the respective water collection pockets. The additional depth of each of these water collection pockets enables each pocket to collect a greater amount of water than in various known pressure relief vents. Water in these enlarged water collection pockets is better distributed relative to these water collection pockets and relative to the respective air passage chambers. These enlarged and connected water collection pockets co-act to better prevent water from passing through the airflow passages in various different circumstances during operating conditions such as when the vehicle is parked at a certain angle, when the vehicle makes a sudden stop, or when the vehicle accelerates rapidly.

Other objects, features, and advantages of the present disclosure will be apparent from the following detailed disclosure and accompanying drawings.

DETAILED DESCRIPTION

Figure 1:
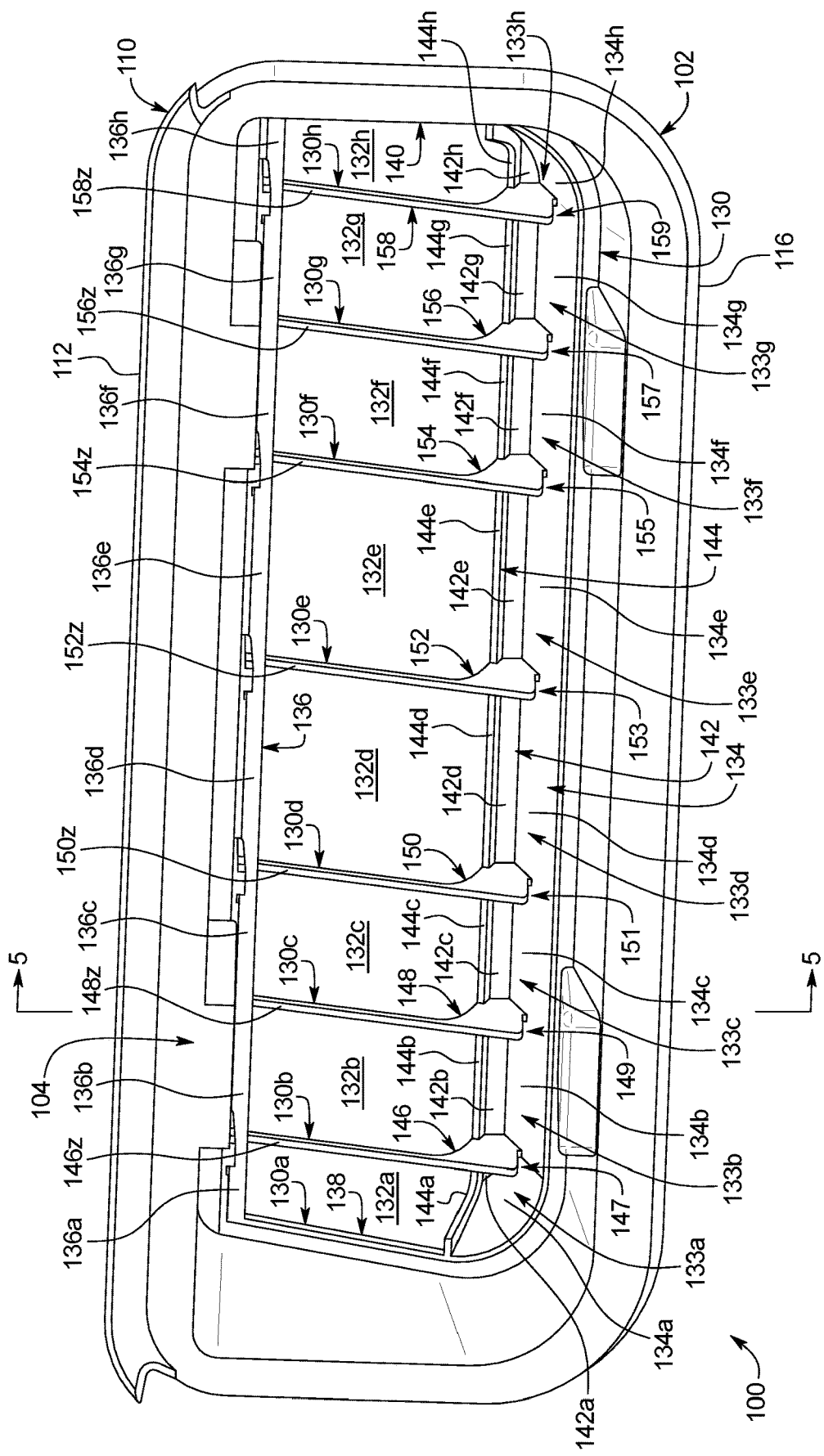
FIG. 1 is an exterior perspective view of a pressure relief vent assembly of one example embodiment of the present disclosure and shown without the vent closing flap of the pressure relief vent assembly for clarity.
Figure 2:
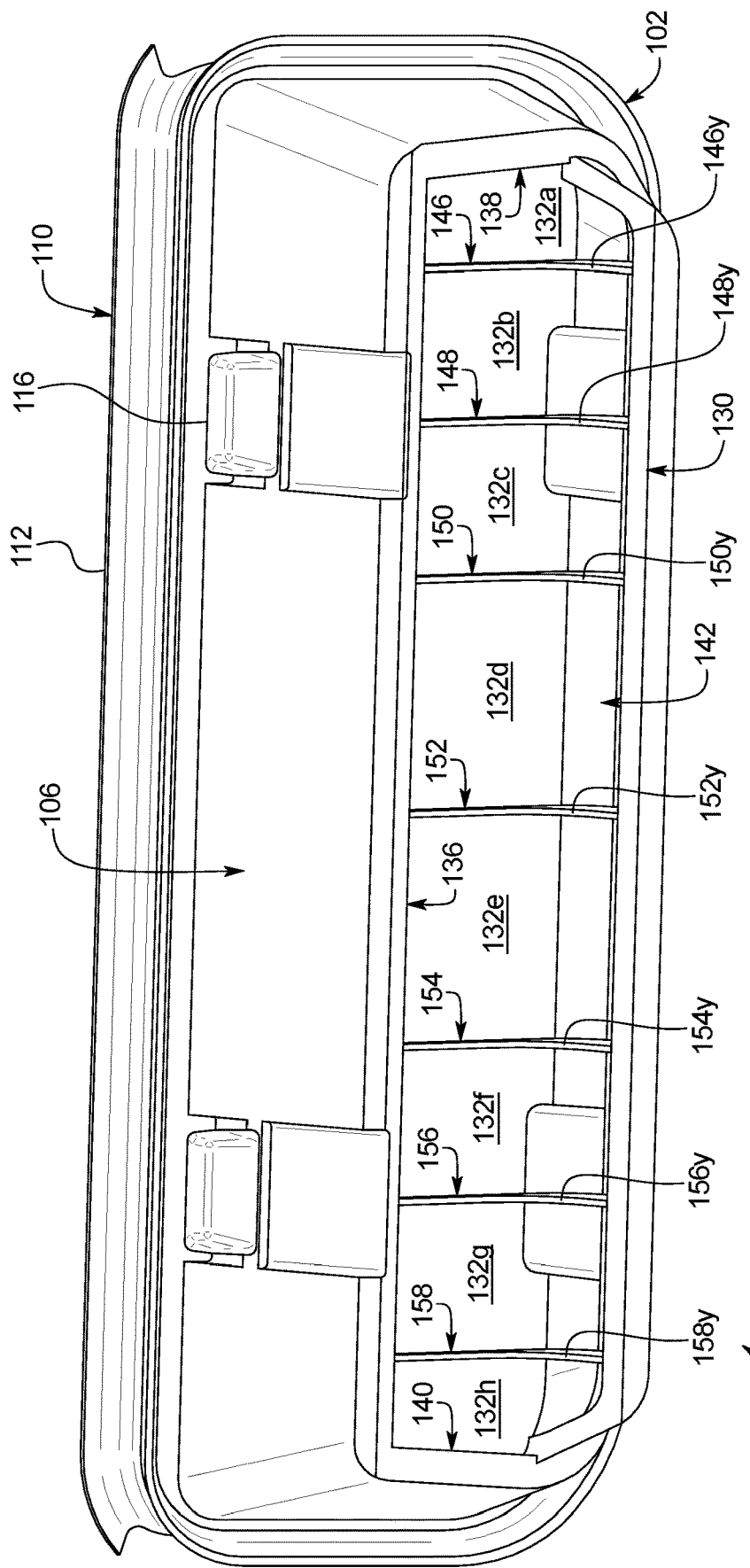
FIG. 2 is an interior perspective view of the pressure relief vent assembly of FIG. 1 and shown without the vent closing flap for clarity.

While the apparatus, assemblies, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

FIGS. 1, 2, 3, 4, and 5 illustrate a pressure relief vent assembly of one example embodiment of the present disclosure and that is generally indicated by numeral 100. The pressure relief vent assembly may sometimes be referred to herein as the "vent assembly" or as the "vent" for brevity. The pressure relief vent assembly 100 is configured to be attached to a component (such as a panel or a frame) of a vehicle. However, it should be appreciated that the pressure relief vent assembly of the present disclosure can be used for other air pressure relief in other objects besides vehicles. The pressure relief vent assembly 100 is formed from a plurality of suitable plastic components in this illustrated example embodiment as further described below. It should be appreciated that the pressure relief vent assembly of the present disclosure can be formed other materials in accordance with the present disclosure.

In this example embodiment, the pressure relief vent assembly 100 includes a frame 102 having a component connection outer portion 110 and an airflow inner portion 130 surrounded by the component connection outer portion 110. The component connection outer portion 110 is configured to be suitably and securely attached to a component (such as a panel or frame) of an object (such as a vehicle). The airflow inner portion 130 defines a plurality of closable air passage chambers 130*a*, 130*b*, 130*c*, 130*d*, 130*e*, 130*f*, 130*g*, and 130*h* that respectively define openable airflow passages 132*a*, 132*b*, 132*c*, 132*d*, 132*e*, 132*f*, 132*g*, and 132*h*. For clarity, FIGS. 1, 2, 3, 4, and 5, are shown without a flap that is pivotally attached to the frame 102 and that is configured to selectively open and close the air passage chambers 130*a*, 130*b*, 130*c*, 130*d*, 130*e*, 130*f*, 130*g*, and 130*h* and thus selectively open and close the airflow passages 132*a*, 132*b*, 132*c*, 132*d*, 132*e*, 132*f*, 132*g*, and 132*h*. Although not shown, the flap is further described below and would be readily understood by those of ordinary skill in the art.

In various embodiments of the present disclosure, the frame 102 is formed from a hard plastic such as acrylic. In various embodiments of the present disclosure, the frame 102 is formed from an injection-molded polypropylene. In various embodiments of the present disclosure, the frame 102 is formed through a thermoforming process. In various embodiments of the present disclosure, all of the various parts (some of which are described below) of the frame are integrally connected and specifically suitably monolithically formed. In various other embodiments of the present disclosure, two or more of the various parts of the frame are separately formed and suitably connected.

The pressure relief vent assembly 100 includes an exterior side 104 and an interior side 106. The vent assembly 100 is configured to be mounted to a respective component (such as a panel or frame) of an object (such as a vehicle) such that the exterior side 104 faces the exterior of the component and the interior side 106 faces the interior of the component. In this position relative to the component of the object, the vent assembly 100 is configured to allow air to pass through the openable airflow passages 132*a*, 132*b*, 132*c*, 132*d*, 132*e*, 132*f*, 132*g*, and 132*h* from the interior of the object (such as a vehicle) to the exterior of the object (such as the vehicle). The vent assembly 100 is also configured to inhibit contaminants such as water from passing through the openable airflow passages 132*a*, 132*b*, 132*c*, 132*d*, 132*e*, 132*f*, 132*g*, and 132*h* from the exterior of the object (such as the vehicle) to the interior of the object (such as the vehicle), as further described below.

Figure 5:
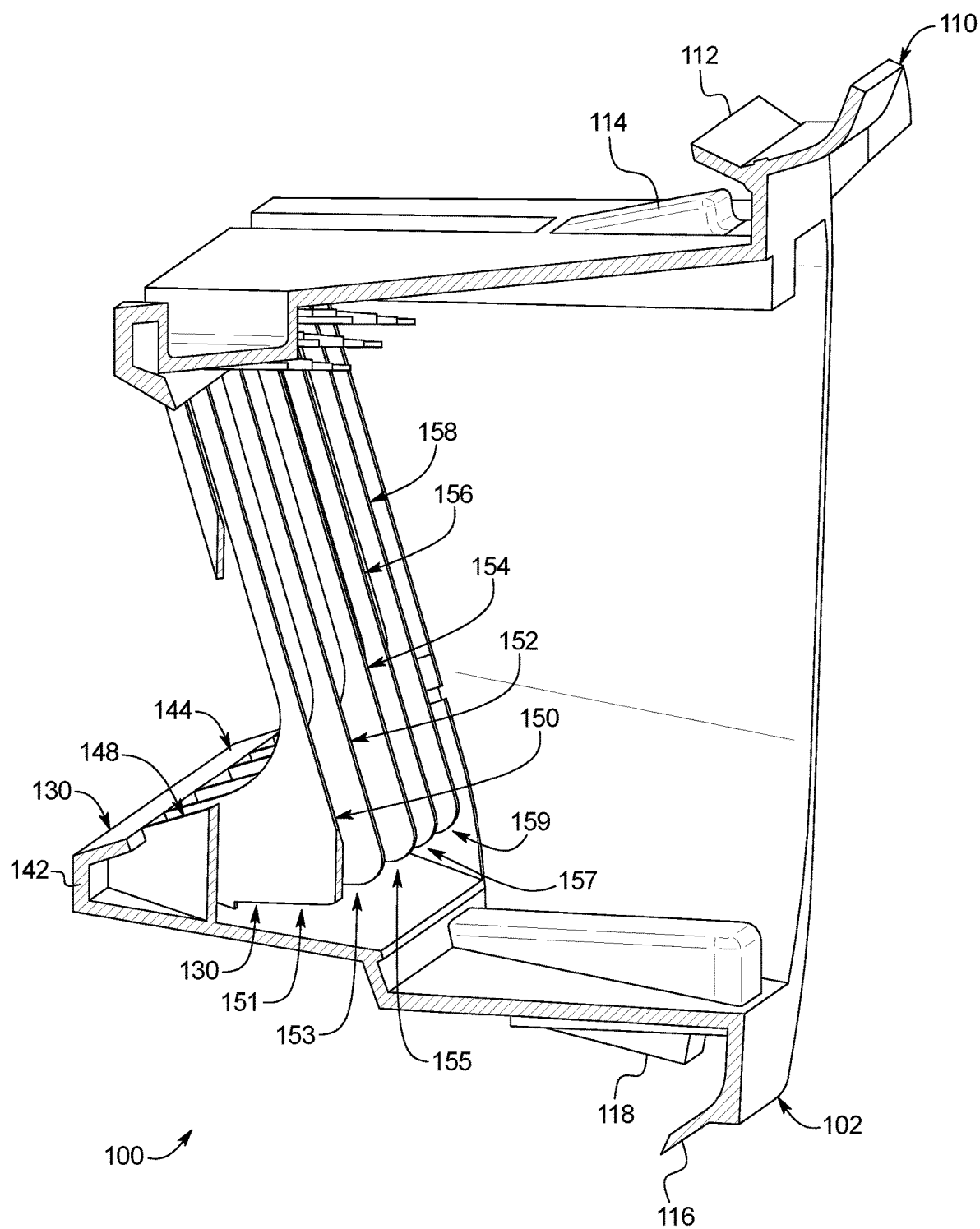
FIG. 5 is an enlarged cross-sectional perspective view of the pressure relief vent assembly of FIG. 1 taken substantially along line 5-5 of FIG. 1, and shown without a vent closing flap for clarity.

More specifically, the component connection outer portion 110 of the frame 102 of the relief vent assembly 100 includes one or more suitable connectors that facilitate connection of the relief vent assembly 100 to a respective component (such as a panel or frame) of the object (such as a vehicle). The connectors may all of the same type or may be of different types. In other words, the pressure relief vent assembly 100 is configured to be secured to a component of an object via the connector(s) of the component connection portion 110 of the frame 102. For example, the pressure relief vent assembly 100 may be configured to be secured in an opening formed through the component. In various example embodiments, the pressure relief vent assembly 100 may be snapped into an opening formed through a panel or fame of a vehicle. In this illustrated example embodiment, the outer portion 110 includes example connectors 112, 114, 116, and 118 (as best seen in FIG. 5). It should be appreciated that the configuration, size, location, and quantity of the connectors may vary in accordance with the present disclosure and will generally be based on the component to which the pressure relief vent 100 is configured to be attached.

In this illustrated example embodiment, the airflow inner portion 130 of the frame 102 of the relief vent assembly 100 includes: (a) a bottom wall 134; (b) a top wall 136; (c) a first side wall 138; (d) a second side wall 140; (e) a water catching back wall 142; (f) a water catching scoop wall 144; and (g) seven reinforcement ribs 146, 148, 150, 152, 154, 156, and 158. These parts respectively form the air passage chambers 130*a*, 130*b*, 130*c*, 130*d*, 130*e*, 130*f*, 130*g*, and 130*h* and define the airflow passages 132*a*, 132*b*, 132*c*, 132*d*, 132*e*, 132*f*, 132*g*, and 132*h*, as further described below.

Specifically, in this illustrated example embodiment, the first air passage chamber 130*a* includes: (a) a first portion 134*a* of the bottom wall 134; (b) a first portion 136*a* of the top wall 136; (c) the first side wall 138; (d) a first portion 142*a* of the water catching back wall 142; (e) a first portion 144*a* of the water catching scoop wall 144; and (f) reinforcement rib 146. These parts (except for the portion of the top wall 136) define a first water collection pocket 133*a* that is configured to collect and hold water. The first portion 144*a* of the water catching scoop wall 144 extends at an obtuse angle from the top of the first portion 142*a* of the water catching back wall 142 and in an exterior direction from the first portion 142*a* of the water catching back wall 142 to provide the first water collection pocket 133*a* that can hold a relatively substantial volume of water and to prevent water that moves into or is moving in the first water collection pocket 133*a* from splashing through the openable airflow passage 132*a*.

Likewise, in this illustrated example embodiment, the second air passage chamber 130*b* includes: (a) a second portion 134*b* of the bottom wall 134; (b) a second portion 136*b* of the top wall 136; (c) a second portion 142*b* of the water catching back wall 142; (d) a second portion 144*b* of the water catching scoop wall 144; (e) reinforcement rib 146, and (f) reinforcement rib 148. These parts (except for the portion of the top wall 136) define a second water collection pocket 133*b* that is configured to collect and hold water. The second portion 144*b* of the water catching scoop wall 144 extends at an obtuse angle from the top of the second portion 142b of the water catching back wall 142 and in an exterior direction from the second portion 142b of the water catching back wall 142 to provide the second water collection pocket 133b that can hold a relatively substantial volume of water and to prevent water that moves into or is moving in the second water collection pocket 133b from splashing through the openable airflow passage 132b.

Likewise, in this illustrated example embodiment, the third air passage chamber 130c includes: (a) a third portion 134c of the bottom wall 134; (b) a third portion 136c of the top wall 136; (c) a third portion 142c of the water catching back wall 142; (d) a third portion 144c of the water catching scoop wall 144; (e) reinforcement rib 148, and (f) reinforcement rib 150. These parts (except for the portion of the top wall 136) define a third water collection pocket 133c that is configured to collect and hold water. The third portion 144c of the water catching scoop wall 144 extends at an obtuse angle from the top of the third portion 142c of the water catching back wall 142 and in an exterior direction from the third portion 142c of the water catching back wall 142 to provide the third water collection pocket 133c that can hold a relatively substantial volume of water and to prevent water that moves into or is moving in the third water collection pocket 133c from splashing through the openable airflow passage 132c.

Likewise, in this illustrated example embodiment, the fourth air passage chamber 130d includes: (a) a fourth portion 134d of the bottom wall 134; (b) a fourth portion 136d of the top wall 136; (c) a fourth portion 142d of the water catching back wall 142; (d) a fourth portion 144d of the water catching scoop wall 144; (e) reinforcement rib 150, and (f) reinforcement rib 152. These parts (except for the portion of the top wall 136) define a fourth water collection pocket 133d that is configured to collect and hold water. The fourth portion 144b of the water catching scoop wall 144 extends at an obtuse angle from the top of the fourth portion 142d of the water catching back wall 142 and in an exterior direction from the fourth portion 142d of the water catching back wall 142 to provide the fourth water collection pocket 133d that can hold a relatively substantial volume of water and to prevent water that moves into or is moving in the fourth water collection pocket 133d from splashing through the openable airflow passage 132d.

Likewise, in this illustrated example embodiment, the fifth air passage chamber 130e includes: (a) a fifth portion 134e of the bottom wall 134; (b) a fifth portion 136e of the top wall 136; (c) a fifth portion 142e of the water catching back wall 142; (d) a fifth portion 144e of the water catching scoop wall 144; (e) reinforcement rib 152, and (f) reinforcement rib 154. These parts (except for the portion of the top wall 136) define a fifth water collection pocket 133e that is configured to collect and hold water. The fifth portion 144e of the water catching scoop wall 144 extends at an obtuse angle from the top of the fifth portion 142e of the water catching back wall 142 and in an exterior direction from the fifth portion 142e of the water catching back wall 142 to provide the fifth water collection pocket 133e that can hold a relatively substantial volume of water and to prevent water that moves into or is moving in the fifth water collection pocket 133e from splashing through the openable airflow passage 132e.

Likewise, in this illustrated example embodiment, the sixth air passage chamber 130f includes: (a) a sixth portion 134f of the bottom wall 134; (b) a sixth portion 136f of the top wall 136; (c) a sixth portion 142f of the water catching back wall 142; (d) a sixth portion 144f of the water catching scoop wall 144; (e) reinforcement rib 154, and (f) reinforcement rib 156. These parts (except for the portion of the top wall 136) define a sixth water collection pocket 133f that is configured to collect and hold water. The sixth portion 144f of the water catching scoop wall 144 extends at an obtuse angle from the top of the sixth portion 142f of the water catching back wall 142 and in an exterior direction from the sixth portion 142f of the water catching back wall 142 to provide the sixth water collection pocket 133f that can hold a relatively substantial volume of water and to prevent water that moves into or is moving in the sixth water collection pocket 133f from splashing through the openable airflow passage 132f.

Likewise, in this illustrated example embodiment, the seventh air passage chamber 130g includes: (a) a seventh portion 134g of the bottom wall 134; (b) a seventh portion 136g of the top wall 136; (c) a seventh portion 142g of the water catching back wall 142; (d) a seventh portion 144g of the water catching scoop wall 144; (e) reinforcement rib 156, and (f) reinforcement rib 158. These parts (except for the portion of the top wall 136) define a seventh water collection pocket 133g that is configured to collect and hold water. The seventh portion 144g of the water catching scoop wall 144 extends at an obtuse angle from the top of the seventh portion 142g of the water catching back wall 142 and in an exterior direction from the seventh portion 142g of the water catching back wall 142 to provide the seventh water collection pocket 133g that can hold a relatively substantial volume of water and to prevent water that moves into or is moving in the seventh water collection pocket 133g from splashing through the openable airflow passage 132g.

Likewise, in this illustrated example embodiment, the eighth air passage chamber 130h includes: (a) an eighth portion 134h of the bottom wall 134; (b) an eighth portion 136h of the top wall 136; (c) the second side wall 140; (d) an eighth portion 142h of the water catching back wall 142; (e) an eighth portion 144h of the water catching scoop wall 144; and (f) reinforcement rib 158. These parts (except for the portion of the top wall 136) define an eighth water collection pocket 133a that is configured to collect and hold water. The eighth portion 144h of the water catching scoop wall 144 extends at an obtuse angle from the top of the eighth portion 142h of the water catching back wall 142 and in an exterior direction from the eighth portion 142h of the water catching back wall 142 to provide the eighth water collection pocket 133h that can hold a relatively substantial volume of water and to prevent water that moves into or is moving in the eighth water collection pocket 133h from splashing through the openable airflow passage 132h.

In this illustrated example embodiment, each of the seven spaced-apart reinforcement ribs 146, 148, 150, 152, 154, 156, and 158 are identical, although it should be appreciated that two or more of the reinforcement ribs may be different in accordance with the present disclosure. For brevity, since the seven reinforcement ribs 146, 148, 150, 152, 154, 156, and 158 are identical, only reinforcement rib 150 is described in more detail herein for brevity.

Figure 3:
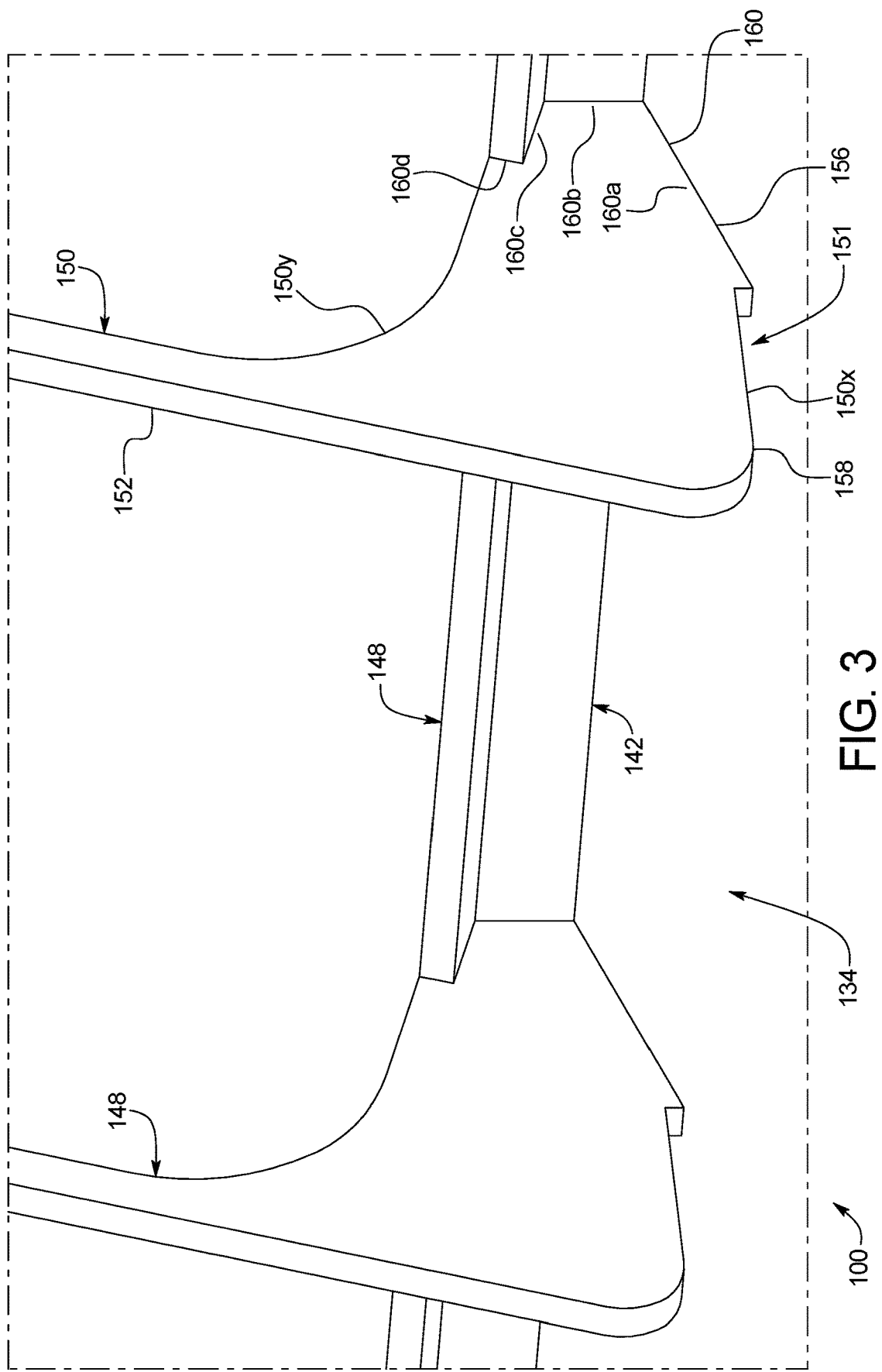
FIG. 3 is an enlarged exterior fragmentary perspective view of a lower central exterior portion of the pressure relief vent assembly of FIG. 1 and shown without the vent closing flap for clarity.
Figure 4:
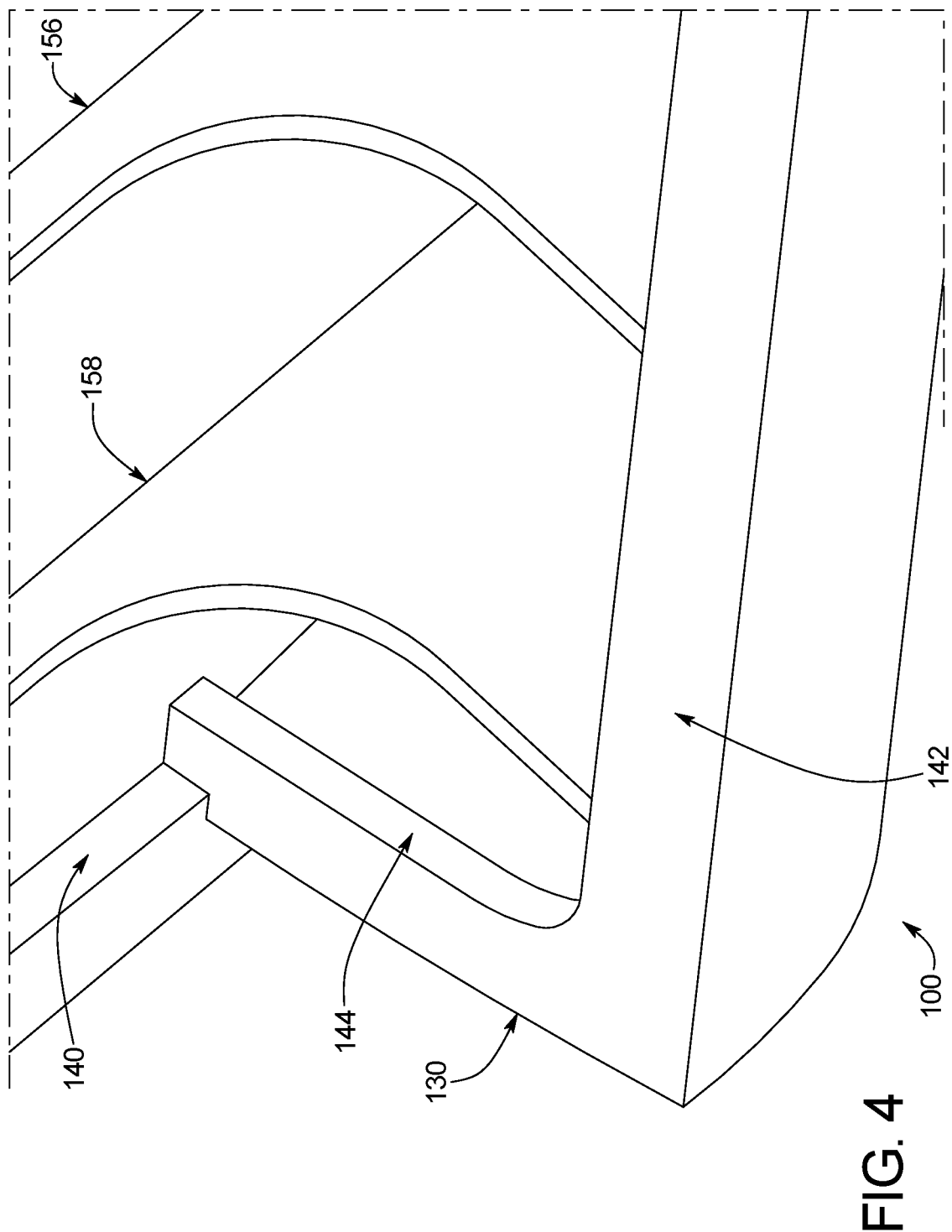
FIG. 4 is an enlarged interior fragmentary perspective view of a lower interior portion of the pressure relief vent assembly of FIG. 1 and shown without the vent closing flap for clarity.

As best seen in FIG. 3, reinforcement rib 150 includes a leg 152 having an upper portion connected to the top wall 136 and a lower portion defining a foot 156 having a heel 158 and a toe 160. The toe 160 is connected to and extends from each of the bottom wall 134, the water catching back wall 142, and the water catching scoop wall 144. More specifically, the toe 160 includes a lower section 160a connected to the bottom wall 134, an exterior section 160b connected to the water catching back wall 142, and top sections 160c and 160d connected to the water catching scoop wall 144. The heel 158 is spaced apart from the bottom wall 134 and includes a lower edge 150*x* that is spaced apart from the bottom wall 134. The heel 158 partially defines (along with the bottom wall 134) a water passage recess 151 under the heel 158. This water passage recess 151 allows water to pass under the heel 158 of the reinforcement rib 150 between adjacent water collection pockets.

It should be appreciated that in this illustrated example embodiment, the seven reinforcement ribs 146, 148, 150, 152, 154, 156, and 158 includes respective heels and recess defining bottom edges 146*x*, 148*x*, 150*x*, 152*x*, 154*x*, 156*x*, and 158*x* thereof that each partially defines (along with the bottom wall 134) respective water passage recesses 147, 149, 151, 153, 155, 157, and 159. These water passage recesses 147, 149, 151, 153, 155, 157, and 159 enable water to move between the water collection pockets and to be more evenly distributed relative to and in the respective water collection pockets 133*a*, 133*b*, 133*c*, 133*d*, 133*e*, 133*f*, 133*g*, and 133*h*. Any water in these water collection pockets is thus better distributed relative to these water collection pockets and thus relative to the respective air passage chambers 130*a*, 130*b*, 130*c*, 130*d*, 130*e*, 130*f*, 130*g*, and 130*h*. More specifically: (1) water passage recess 147 fluidly connects and allows water to flow between water collection pockets 133*a* and 133*b*; (2) water passage recess 149 fluidly connects and allows water to flow between water collection pockets 133*b* and 133*c*; (3) water passage recess 151 fluidly connects and allows water to flow between water collection pockets 133*c* and 133*d*; (4) water passage recess 153 fluidly connects and allows water to flow between water collection pockets 133*d* and 133*e*; (5) water passage recess 155 fluidly connects and allows water to flow between water collection pockets 133*e* and 133*f*; (6) water passage recess 157 fluidly connects and allows water to flow between water collection pockets 133*f* and 133*g*; and (7) water passage recess 159 fluidly connects and allows water to flow between water collection pockets 133*g* and 133*h*. These water passage recesses 147, 149, 151, 153, 155, 157, and 159 thus connect all of the water collection pockets 133*a*, 133*b*, 133*c*, 133*d*, 133*e*, 133*f*, 133*g*, and 133*h*. These enlarged and connected water collection pockets 133*a*, 133*b*, 133*c*, 133*d*, 133*e*, 133*f*, 133*g*, and 133*h* co-act to better prevent water from passing through the airflow passages 132*a*, 132*b*, 132*c*, 132*d*, 132*e*, 132*f*, 132*g*, and 132*h* in various different circumstances during operating conditions such as when the vehicle is parked at a certain angle, when the vehicle makes a sudden stop, or when the vehicle accelerates rapidly. The additional depth of each of these water collection pockets 133*a*, 133*b*, 133*c*, 133*d*, 133*e*, 133*f*, 133*g*, and 133*h* also enable each pocket to collect a greater amount of water than in various known pressure relief vents.

In this illustrated example embodiment, the seven reinforcement ribs 146, 148, 150, 152, 154, 156, and 158 also include respective radiused or curved interior edges 146*y*, 148*y*, 150*y*, 152*y*, 154*y*, 156*y*, and 158*y* that further define the water collection pockets 133*a*, 133*b*, 133*c*, 133*d*, 133*e*, 133*f*, 133*g*, and 133*h* and make each of the pockets larger and able to hold more water.

In this illustrated example embodiment, each of the seven reinforcement ribs 146, 148, 150, 152, 154, 156, and 158 includes respective exterior relatively straight edges 146*z*, 148*z*, 150*z*, 152*z*, 154*z*, 156*z*, and 158*z* that collectively define the surfaces against which the flap (not shown): (1) engages to close the respective air passage chambers 130*a*, 130*b*, 130*c*, 130*d*, 130*e*, 130*f*, 130*g*, and 130*h*; and (2) disengages and pivots away from to open the respective air passage chambers 130*a*, 130*b*, 130*c*, 130*d*, 130*e*, 130*f*, 130*g*, and 130*h*. In other words, the pressure relief vent assembly 100 includes one or more suitable flaps (not shown in FIGS. 1 to 5 for clarity) that is/are pivotally connected to the frame 102 and specifically the air passage chambers 130*a*, 130*b*, 130*c*, 130*d*, 130*e*, 130*f*, 130*g*, and 130*h* to selectively close and open the airflow passages 132*a*, 132*b*, 132*c*, 132*d*, 132*e*, 132*f*, 132*g*, and 132*h*. The flap(s) is/are positioned over the respective air passages and is/are configured to allow air to pass in one direction when the flap(s) pivot(s) relative to the frame 102.

It should also be appreciated that the quantity of air passage chambers and respective airflow passages as well as the quantity of reinforcement ribs may vary in accordance with the present disclosure.

The pressure relief vent assembly of the present disclosure may alternatively be oriented in a different manner and may include the same or an alternative quantity of air passage chambers, air passages, and flaps in accordance with the present disclosure.

For example, turning now to FIGS. 6, 6A, 7, 8, and 9, a pressure relief vent assembly of another example embodiment of the present disclosure is generally illustrated and generally indicated by numeral 200. The pressure relief vent assembly may sometimes be referred to herein as the "relief vent assembly" or as the "vent assembly" for brevity. The pressure relief vent assembly 200 is configured to be attached to a component (such as a panel or a frame) of an object (such as a vehicle). The pressure relief vent assembly 200 is formed from a plurality of suitable plastic components in this illustrated example embodiment, as further described below. It should be appreciated that the pressure relief vent assembly of the present disclosure can be formed from other materials in accordance with the present disclosure.

The example pressure relief vent assembly 100 is generally configured for a more horizontally or substantially horizontally extending opening. The pressure relief vent assembly 200 is generally configured for a more vertically or substantially vertically extending opening. It should thus be appreciated that the pressure relief vent assemblies of the present disclosure can be implemented for openings that extend in various different directions.

Like the pressure relief vent assembly 100, the pressure relief vent assembly 200 includes a frame 202 including a component connection outer portion 210 and an airflow inner portion 230 surrounded by the component connection outer portion 210. The component connection outer portion 210 is configured to be suitably and securely attached to a component (such as a panel or frame) of an object (such as a vehicle). The airflow inner portion 230 defines a plurality of closable air passage chambers 230*a*, 230*b*, 230*c*, 230*d*, 230*e*, 230*f*, 230*g*, 230*h*, 230*i*, 230*j*, 230*k*, and 230*l* that respectively define openable airflow passages 232*a*, 232*b*, 232*c*, 232*d*, 232*e*, 232*f*, 232*g*, 232*h*, 232*i*, 232*j*, 232*k*, and 232*l*. The pressure relief vent assembly 200 also includes flaps 280*a*, 280*b*, 280*c*, and 280*d* that are pivotally attached to the frame 202 and that are configured to selectively open and close the air passage chambers 230*a*, 230*b*, 230*c*, 230*d*, 230*e*, 230*f*, 230*g*, 230*h*, 230*i*, 230*j*, 230*k*, and 230*l*, and thus selectively open and close the airflow passages 232*a*, 232*b*, 232*c*, 232*d*, 232*e*, 232*f*, 232*g*, 232*h*, 232*i*, 232*j*, 232*k*, and 232*l*.

In various embodiments of the present disclosure, the frame 202 is formed from a hard plastic such as acrylic. In various embodiments of the present disclosure, the frame 202 is formed from an injection-molded polypropylene. In various embodiments of the present disclosure, the frame 202 is formed through a thermoforming process. In various embodiments of the present disclosure, all of the various parts (some of which are described below) of the frame are integrally connected and specifically suitably monolithically formed. In various other embodiments of the present disclosure, two or more of the various parts of the frame are separately formed and suitably connected.

The pressure relief vent assembly 200 includes an exterior side 204 and an interior side 206. The vent assembly 200 is configured to be mounted to a respective component (such as a panel or frame) of an object (such as a vehicle) such that the exterior side 204 faces the exterior of the component and the interior side 106 faces the interior of the component. In this position relative to the component of the object, the vent assembly 200 is configured to allow air to pass through the openable airflow passages 232a, 232b, 232c, 232d, 232e, 232f, 232g, 232h, 232i, 232j, 232k, and 232l from the interior of the object (such as a vehicle) to the exterior of the object (such as the vehicle). The vent assembly 200 is also configured to inhibit contaminants such as water from passing through the openable airflow passages 232a, 232b, 232c, 232d, 232e, 232f, 232g, 232h, 232i, 232j, 232k, and 232l from the exterior of the object (such as the vehicle) to the interior of the object (such as the vehicle), as further described below.

More specifically, the component connection outer portion 210 of the frame 202 of the relief vent assembly 200 includes one or more suitable connectors that facilitate connection of the relief vent assembly 200 to a respective component (such as a panel or frame) of the object (such as a vehicle). The connectors may all be of the same type or may be of different types. In other words, the pressure relief vent assembly 200 is configured to be secured to a component of an object via the connector(s) of the component connection portion 210 of the frame 202. For example, the pressure relief vent assembly 200 may be configured to be secured in an opening formed through the component. In various example embodiments, the pressure relief vent assembly 200 may be snapped into an opening formed through a panel or fame of a vehicle. In this illustrated example embodiment, the outer portion 210 includes example connectors 212, 214, 216, and 218. It should be appreciated that the configuration, size, location, and quantity of the connectors may vary in accordance with the present disclosure and will generally be based on the component and the object to which the pressure relief vent assembly 200 is configured to be attached.

Figure 6:
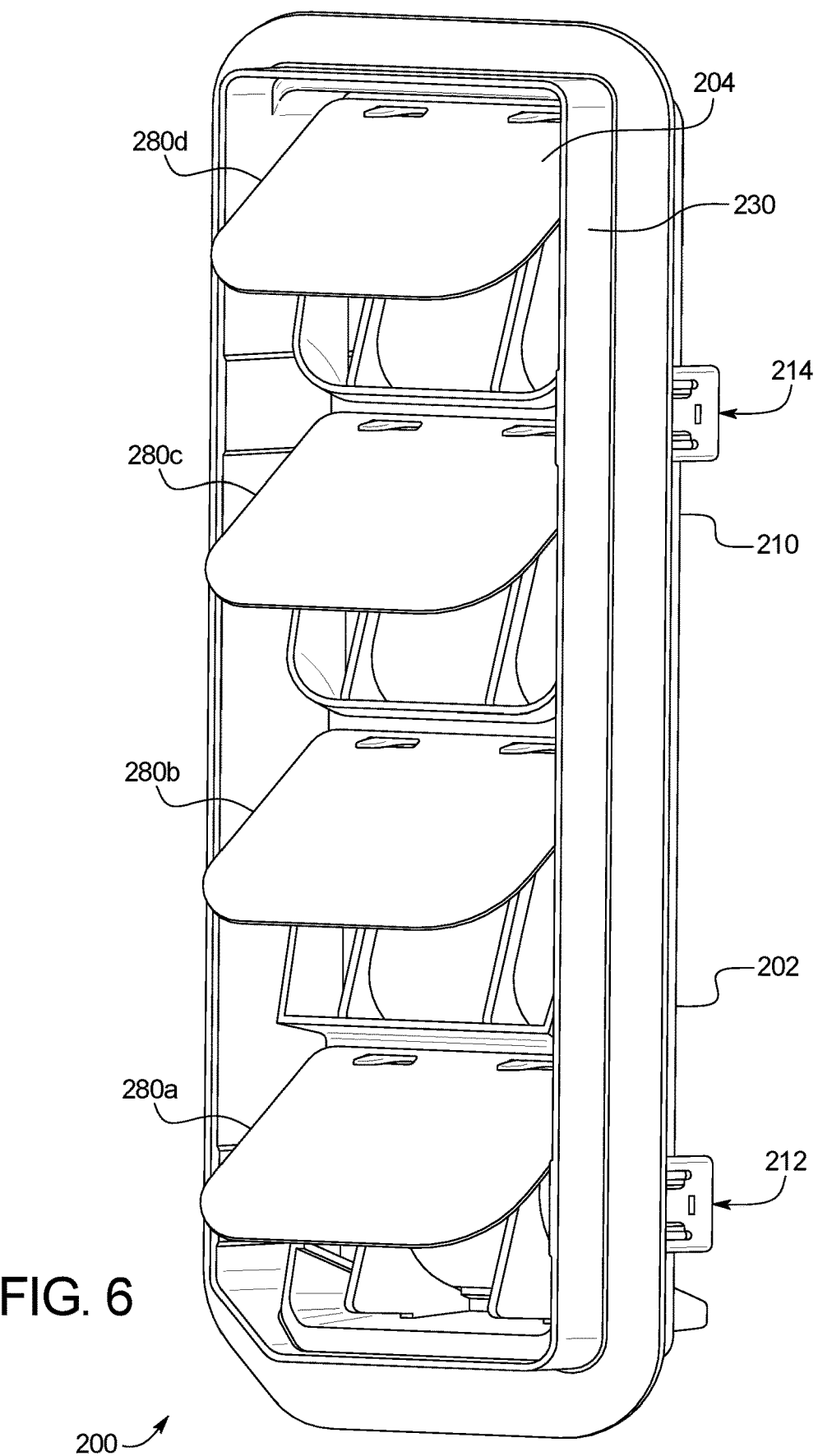
FIG. 6 is an exterior perspective view of a pressure relief vent assembly of another example embodiment of the present disclosure and shown with four vent closing flaps in open positions.
Figure 6A:
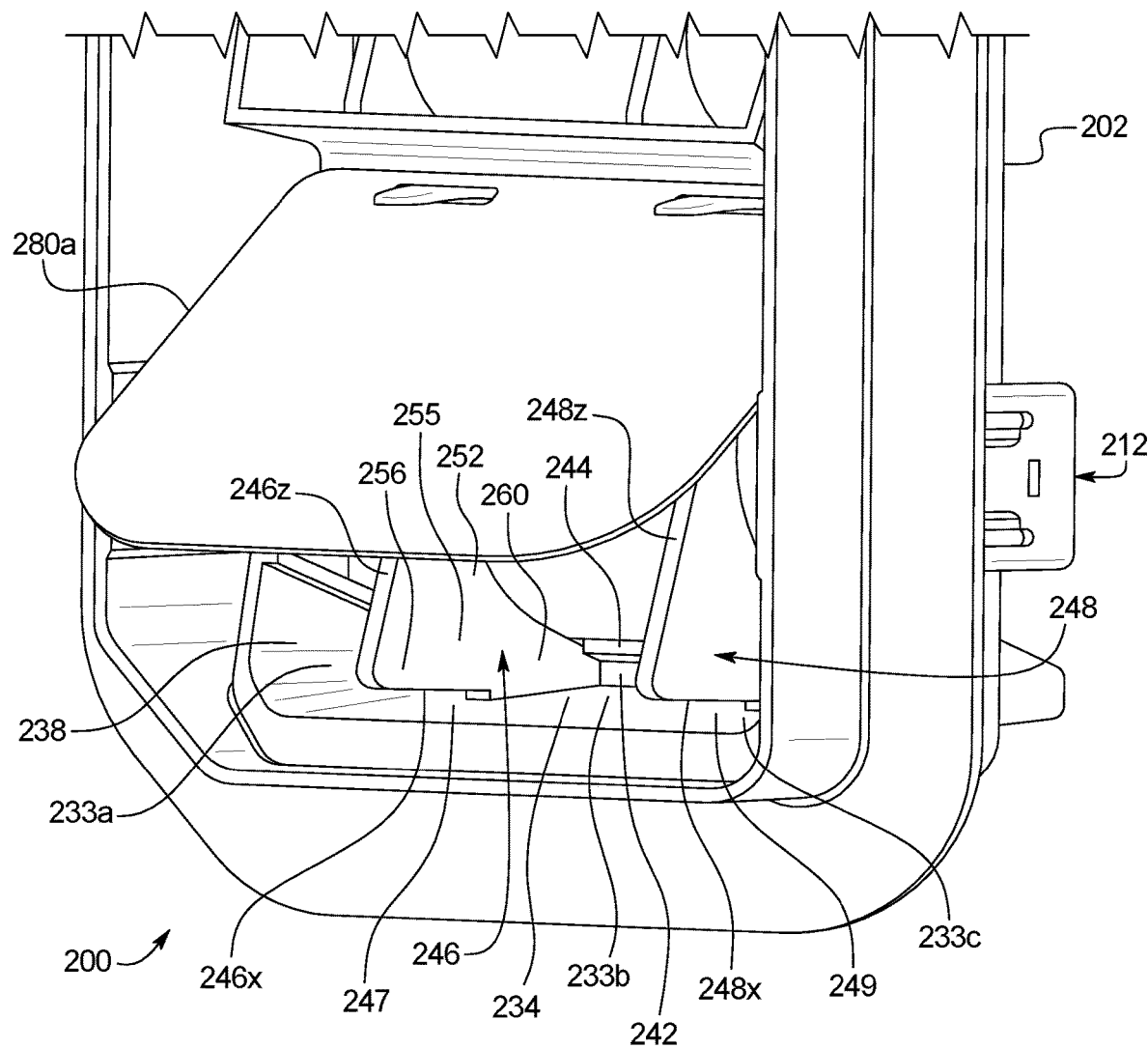
FIG. 6A is an enlarged fragmentary exterior perspective view of a bottom portion of the pressure relief vent assembly of FIG. 6 and shown with one of the four vent closing flap in an open position.
Figure 7:
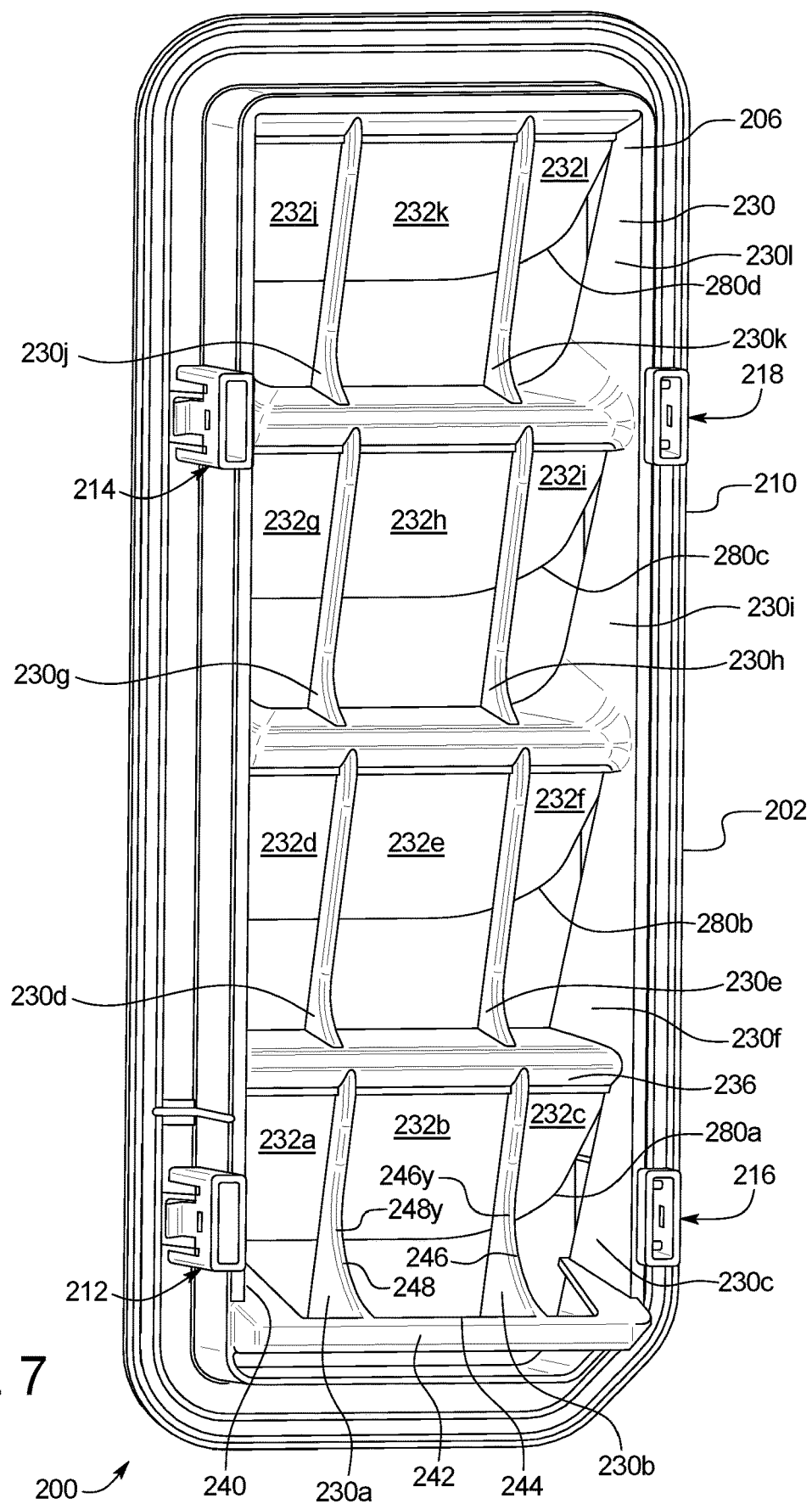
FIG. 7 is an interior perspective view of the pressure relief vent assembly of FIG. 6 and shown with the four vent closing flaps in open positions.

Each flap 280a, 280b, 280c, and 280d is suitably pivotally connected to the frame 202. The plurality of flaps 280a, 280b, 280c, and 280d of the pressure relief vent assembly 200 are thus respectively pivotally connected to the air passage chambers 230a, 230b, 230c, 230d, 230e, 230f, 230g, 230h, 230i, 230j, 230k, and 230l to selectively cover and open the airflow passages 232a, 232b, 232c, 232d, 232e, 232f, 232g, 232h, 232i, 232j, 232k, and 232l. Each flap is positioned over three respective air passages and is configured to allow air to pass in one direction. More specifically, in the at-rest positions shown in FIGS. 8 and 9, the flaps 280a, 280b, 280c, and 280d cover the airflow passages airflow passages 232a, 232b, 232c, 232d, 232e, 232f, 232g, 232h, 232i, 232j, 232k, and 232l. As air pressure builds and is exerted into undersides of the flaps 280a, 280b, 280c, and 280d, the flaps 280a, 280b, 280c, and 280d pivot or otherwise open so that the airflow passages airflow passages 232a, 232b, 232c, 232d, 232e, 232f, 232g, 232h, 232i, 232j, 232k, and 232l are exposed as shown in FIGS. 6, 6A, and 7, thereby allowing air to flow through the pressure relief vent assembly 200. In various embodiments of the present disclosure, the flaps are formed from a flexible thermoplastic elastomer, such as ethylene propylene diene monomer (EPDM) rubber, polypropylene, Hytrel, Lexan, Tyvac or Mylar. In various embodiments of the present disclosure, the flaps are formed from an injection-molded polypropylene. In various embodiments of the present disclosure, the flaps are formed through a thermoforming process. It should be appreciated that a wider flap may be used for the vent assembly 100 described above.

In this illustrated example embodiment, the airflow inner portion 230 of the frame 202 of the relief vent assembly 200 includes four sections of the closable air passage chambers. The first section includes closable air passage chambers 230a, 230b, and 230c. The second section includes closable air passage chambers 230d, 230e, and 230f. The third section includes closable air passage chambers 230g, 230h, and 230i. The fourth section includes closable air passage chambers 230j, 230k, and 230l. These sections are similar except that in this example embodiment, only the first section closable air passage chambers 230a, 230b, and 230c include the enlarged water collection pockets and the water passage recesses. It should be appreciated that in further alternative embodiments, one or more of these other sections can include such features.

More specifically, the first section includes: (a) a bottom wall 234; (b) a top wall 236; (c) a first side wall 238; (d) a second side wall 240; (e) a water catching back wall 242; (f) a water catching scoop wall 244; and (g) two reinforcement ribs 246 and 248. These parts respectively form the air passage chambers 230a, 230b, and 230c, and define the airflow passages 232a, 232b, and 232c.

Similar to the above described embodiment and as best shown in FIG. 6A, in this illustrated example embodiment, the first air passage chamber 230a includes: (a) a first portion (not labeled) of the bottom wall 234; (b) a first portion (not labeled) of the top wall 236; (c) the first side wall 238; (d) a first portion (not labeled) of the water catching back wall 242; (e) a first portion (not labeled) of the water catching scoop wall 244; and (f) reinforcement rib 246. These parts (except for the portion of the top wall 236) define a first water collection pocket 233a that is configured to collect and hold water. The first portion of the water catching scoop wall 244 extends at an obtuse angle from the top of the first portion of the water catching back wall 242 and in an exterior direction from the first portion of the water catching back wall 242 to provide the first water collection pocket 233a that can hold a relatively substantial volume of water and to prevent water that moves into or is moving in the first water collection pocket 233a from splashing through the openable airflow passage 232a.

Likewise, in this illustrated example embodiment, the second air passage chamber 230b includes: (a) a second portion (not labeled) of the bottom wall 234; (b) a second portion (not labeled) of the top wall 236; (c) a second portion (not labeled) of the water catching back wall 242; (d) a second portion (not labeled) of the water catching scoop wall 244; (e) reinforcement rib 246; and (f) reinforcement rib 248. These parts (except for the portion of the top wall 236) define a second water collection pocket 233b that is configured to collect and hold water. The second portion of the water catching scoop wall 244 extends at an obtuse angle from the top of the second portion of the water catching back wall 242 and in an exterior direction from the second portion of the water catching back wall 242 to provide the second water collection pocket 233b that can hold a relatively substantial volume of water and to prevent water that moves into or is moving in the second water collection pocket 233b from splashing through the openable airflow passage 232b.

Likewise, in this illustrated example embodiment, the third air passage chamber 230c includes: (a) a third portion (not labeled) of the bottom wall 134; (b) a third portion (not labeled) of the top wall 236; (c) a third portion (not labeled) of the water catching back wall 242; (d) a third portion (not labeled) of the water catching scoop wall 244; (e) reinforcement rib 248; and (f) the second side wall 242. These parts (except for the portion of the top wall 236) define a third water collection pocket 233c that is configured to collect and hold water. The third portion of the water catching scoop wall 244 extends at an obtuse angle from the top of the third portion of the water catching back wall 242 and in an exterior direction from the third portion of the water catching back wall 242 to provide that the third water collection pocket 233c can hold a relatively substantial volume of water and to prevent water that moves into or is moving in the third water collection pocket 233c from splashing through the openable airflow passage 232c.

In this illustrated example embodiment, each of the two reinforcement ribs 246 and 248 are identical, although it should be appreciated that two or more of the reinforcement ribs may be different in accordance with the present disclosure. For brevity, since the two reinforcement ribs 246 and 248 are identical, only reinforcement rib 246 is described in more detail.

Reinforcement rib 246 is similar or identical to reinforcement rib 150 described above. As best seen in FIGS. 6A and 7, reinforcement rib 246 includes a leg 252 having an upper portion connected to the top wall 236 and a lower portion defining a foot 255 having a heel 256 and a toe 260. The toe 260 is connected to and extends from each of the bottom wall 234, the water catching back wall 242, and the water catching scoop wall 244. More specifically, the toe 260 includes a lower section (not labeled) connected to the bottom wall 234, an exterior section (not labeled) connected to the water catching back wall 242, and top sections (not labeled) connected to the water catching scoop wall 244. The heel 258 is spaced apart from the bottom wall 234 and includes a lower edge 246x that is spaced apart from the bottom wall 234. The heel 258 partially defines (along with the bottom wall 234) a water passage recess 247 under the heel 258. This water passage recess 247 allows water to pass under the heel 258 of the reinforcement rib 246 between adjacent pockets.

It should be appreciated that in this illustrated example embodiment, each of the two reinforcement ribs 246 and 248 includes respective heels and recess defining bottom edges 246x and 248x thereof that each partially defines (along with the bottom wall 234) respective water passage recesses 247 and 249. These water passage recesses 247 and 249 enable water to move between the pockets and to be more evenly distributed relative to and in the respective water collection pockets 233a, 233b, and 233c. Any water in these water collection pockets is thus better distributed relative to these water collection pockets and thus relative to the respective air passage chambers 230a, 230b, and 230c. More specifically: (1) water passage recess 247 fluidly connects and allows water to flow between water collection pockets 233a and 233b; and (2) water passage recess 249 fluidly connects and allows water to flow between water collection pockets 233b and 233c. These water passage recesses 247 and 249 thus connect all of the water collection pockets 233a, 233b, and 233c. These enlarged and connected water collection pockets 233a, 233b, and 233c co-act to better prevent water from passing through the airflow passages 232a, 232b, and 232c in various operating conditions such as when the vehicle is parked at a certain angle, when the vehicle makes a sudden stop, or when the vehicle accelerates rapidly. The additional depth of each of these water collection pockets 233a, 233b, and 233c, also enable each water collection pocket to collect a greater amount of water than in known pressure relief vents.

In this illustrated example embodiment, each of the two reinforcement ribs 246 and 248 includes respective radiused or curved interior edges 246y and 248y that further define the water collection pockets 233a, 233b, and 233c and make each of the pockets larger and able to hold more water.

Figure 8:
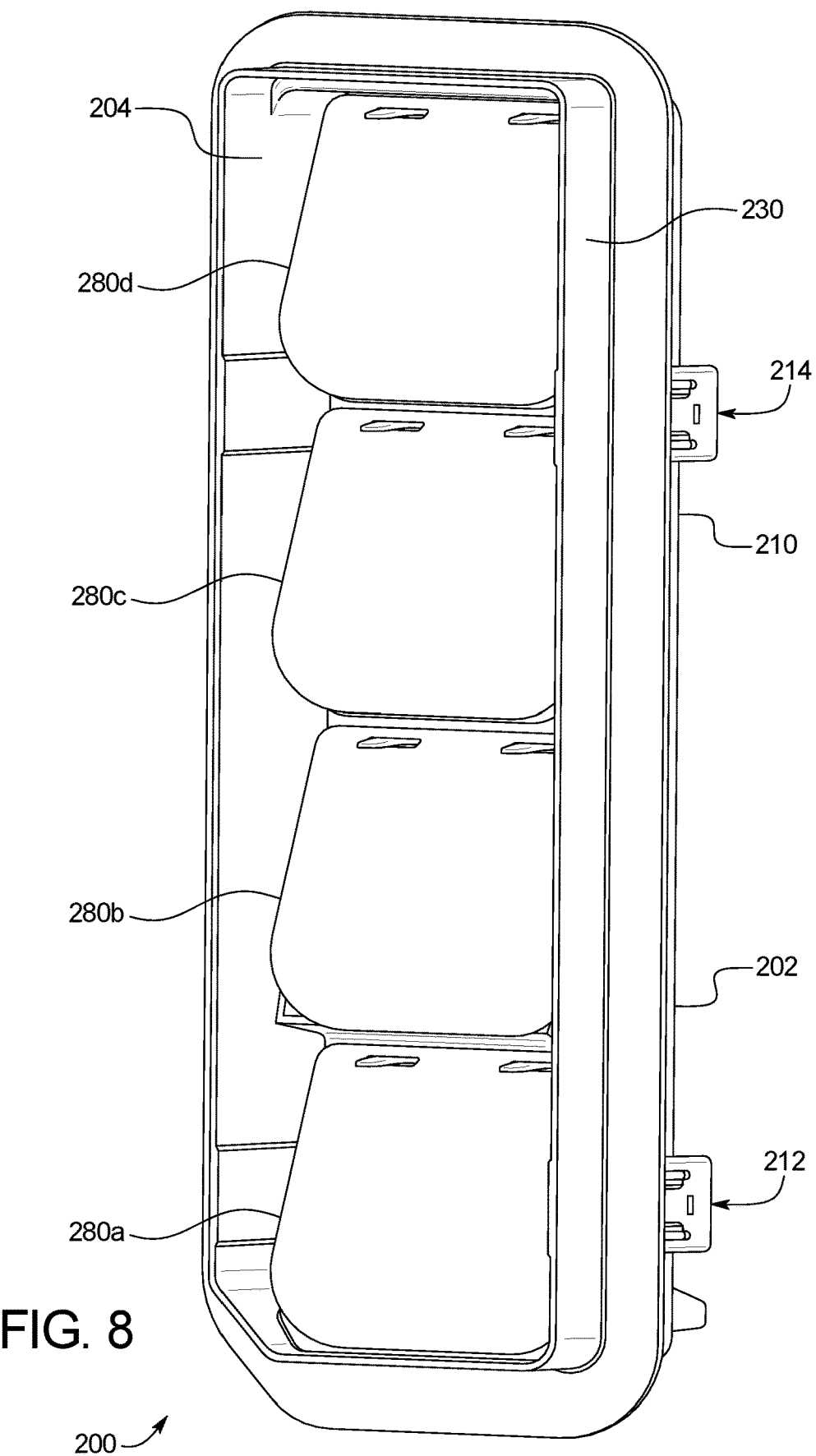
FIG. 8 is an exterior perspective view of the pressure relief vent assembly of FIG. 6 and shown with the four vent closing flaps in closed positions.
Figure 9:
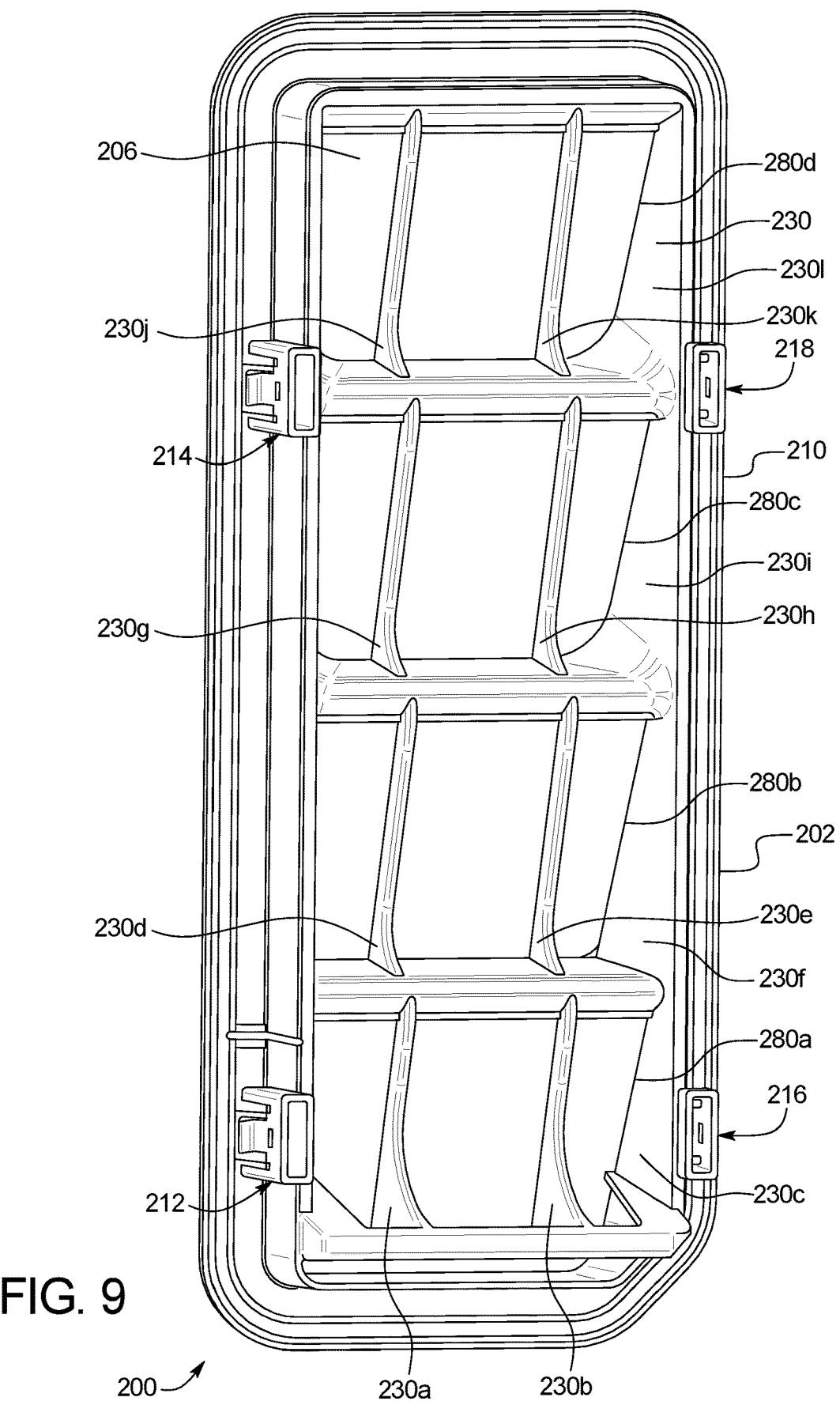
FIG. 9 is an interior perspective view of the pressure relief vent assembly of FIG. 6 and shown with the four vent closing flaps in closed positions.

In this illustrated example embodiment, each of the two reinforcement ribs 246 and 248 includes respective exterior relatively straight edges 246z and 248z that collectively define the surfaces against which the flap 280a (1) engages to close the respective air passage chambers 230a, 230b, and 230c as shown in FIGS. 7 and 9; and (2) disengages and pivots away from to open the respective air passage chambers 230a, 230b, and 230c as shown in FIGS. 6, 6A, and 8.

In this illustrated example embodiment, the air passage chambers 230d, 230e, 230f, 230g, 230h, 230i, 230j, 230k, and 230l do not include the scoops or the ribs with heels spaced from the respective bottom surfaces of those air passage chambers because water tends not to collect in such higher air passage chambers. It should be appreciated that one or more of such air passage chambers could include such scoops and/or such ribs in accordance with the present disclosure.

It should also be appreciated that the quantity of air passage chambers and respective airflow passages as well as the quantity of reinforcement ribs may vary in accordance with the present disclosure.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A pressure relief valve assembly comprising:
a frame including:
a component connection portion configured to be securely attached to a component of an object; and
an airflow portion including a plurality of closable air passage chambers that respectively define openable airflow passages, the airflow portion including a bottom wall, a water catching back wall, and a water catching scoop wall, and a first reinforcement rib including a bottom edge that partially defines a first water passage recess that fluidly connects a first water collection pocket of a first one of the closable air passage chambers to an adjacent second water collection pocket of a second one of the closable air passage chambers, wherein the water catching scoop wall extends at an obtuse angle from the water catching back wall at least primarily in an airflow direction through the airflow portion.

2. The pressure relief valve assembly of claim 1, wherein the first reinforcement rib includes a heel spaced from the bottom wall, wherein the heel includes the bottom edge.

3. The pressure relief valve assembly of claim 1, wherein the first reinforcement rib includes a toe connected to a heel and connected to the bottom wall.

4. The pressure relief valve assembly of claim 1, which includes a second reinforcement rib including a bottom edge that partially defines a second water passage recess that fluidly connects the second water collection pocket of the second one of the closable air passage chambers to an adjacent third water collection pocket of a third one of the closable air passage chambers.

5. The pressure relief valve assembly of claim 4, wherein the first and second reinforcement ribs and the first and second water passage recesses are configured to allow water to move from the first water collection pocket to the third water collection pocket.

6. The pressure relief valve assembly of claim 1, wherein the plurality of closable air passage chambers include a water catching back wall and a water catching scoop wall that partially define the first water collection pocket and the second water collection pocket.

7. The pressure relief valve assembly of claim 1, wherein the water catching scoop wall extends at the obtuse angle from a top of the water catching back wall.

8. The pressure relief valve assembly of claim 1, wherein the first reinforcement rib includes a curved interior edge.

9. A pressure relief valve assembly comprising:
 a frame including:
  a component connection portion configured to be securely attached to a component of an object; and
  an airflow portion including a plurality of closable air passage chambers that respectively define openable airflow passages, the airflow portion including a bottom wall, a top wall, a first side wall, a second side wall, a water catching back wall, and a water catching scoop wall, wherein the bottom wall, the water catching back wall, and the water catching scoop wall partially define at least one water collection pocket, and wherein the water catching scoop wall extends at an obtuse angle from the water catching back wall at least primarily in an airflow direction through the airflow portion.

10. The pressure relief valve assembly of claim 9, wherein the airflow portion includes a first reinforcement rib, wherein the bottom wall, the first side wall, the water catching back wall, the water catching scoop wall, and the first reinforcement rib define a first water collection pocket.

11. The pressure relief valve assembly of claim 10, wherein the airflow portion includes a second reinforcement rib, wherein the bottom wall, the second side wall, the water catching back wall, the water catching scoop wall, and the second reinforcement rib define a second water collection pocket.

12. The pressure relief valve assembly of claim 11, wherein the first reinforcement rib includes an edge that partially defines a first water passage recess, and the second reinforcement rib includes an edge that partially defines a second water passage recess, wherein the first and second water passage recesses are configured to allow water to move from the first water collection pocket to the second water collection pocket.

13. The pressure relief valve assembly of claim 11, wherein the bottom wall, the water catching back wall, the water catching scoop wall, the first reinforcement rib, and the second reinforcement rib define a third water collection pocket between the first and second water collection pockets.

14. The pressure relief valve assembly of claim 10, wherein the first reinforcement rib includes a curved interior edge.

15. A pressure relief valve assembly comprising:
 a frame including:
  a component connection portion configured to be securely attached to a component of an object; and
  an airflow portion including a plurality of closable air passage chambers that respectively define openable airflow passages, the airflow portion including a bottom wall, a top wall, a water catching back wall, and a water catching scoop wall, a plurality of reinforcement ribs, wherein the bottom wall, the water catching back wall, the water catching scoop wall, and the plurality of reinforcement ribs define a plurality of water collection pockets, wherein the plurality of reinforcement ribs each includes a bottom edge that partially defines a water passage recess that fluidly connects two of the water connection pockets, and wherein the water catching scoop wall extends at an obtuse angle from the water catching back wall at least primarily in an airflow direction through the airflow portion.

16. The pressure relief valve assembly of claim 14, wherein each respective pair of the reinforcement ribs partially defines water passage recesses that fluidly connects two of the water collection pockets.

17. The pressure relief valve assembly of claim 14, wherein each reinforcement rib includes a toe connected to a heel and connected to the bottom wall.

18. The pressure relief valve assembly of claim 17, wherein the heel of each reinforcement rib is spaced apart from the bottom wall.

19. The pressure relief valve assembly of claim 15, wherein the water catching scoop wall extends at the obtuse angle from a top of the water catching back wall.

20. The pressure relief valve assembly of claim 15, wherein each reinforcement rib includes a curved interior edge.

* * * * *